(12) United States Patent
Issa (10) Patent No.: US 8,145,203 B2
(45) Date of Patent: *Mar. 27, 2012

(54) PERSONAL AREA NETWORK HAVING MEDIA PLAYER AND MOBILE DEVICE CONTROLLING THE SAME

(75) Inventor: Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/096,214

(22) Filed: Apr. 28, 2011

(65) Prior Publication Data

US 2011/0202636 A1    Aug. 18, 2011

Related U.S. Application Data

(63) Continuation of application No. 12/846,109, filed on Jul. 29, 2010, now Pat. No. 7,949,333, which is a continuation of application No. 11/270,293, filed on Nov. 9, 2005, now Pat. No. 7,787,904.

(51) Int. Cl.
*H04M 3/00* (2006.01)
*H04W 68/00* (2009.01)
*H04B 7/00* (2006.01)

(52) U.S. Cl. ........ 455/420; 455/459; 455/517; 455/41.2

(58) Field of Classification Search .................. 455/41.1, 455/41.2, 41.3, 420, 459, 517
See application file for complete search history.

(56) References Cited

U.S. PATENT DOCUMENTS

| | | | |
|---|---|---|---|
| 6,529,949 B1 | 3/2003 | Getsin et al. | |
| 6,662,231 B1 | 12/2003 | Drosset et al. | |
| 7,167,677 B2 | 1/2007 | Jung | |
| 7,483,958 B1 | 1/2009 | Elabbady et al. | |
| 7,787,904 B2 | 8/2010 | Issa | |
| 7,949,333 B2 * | 5/2011 | Issa | ............................... 455/420 |
| 2004/0224638 A1 | 11/2004 | Fadell et al. | |
| 2005/0009561 A1 | 1/2005 | Hollstrom et al. | |
| 2005/0021418 A1 | 1/2005 | Marcus et al. | |
| 2005/0097595 A1 | 5/2005 | Lipsanen et al. | |
| 2005/0216941 A1 | 9/2005 | Flanagan et al. | |
| 2007/0048712 A1 | 3/2007 | Plastina et al. | |
| 2007/0174471 A1 | 7/2007 | Van Rossum | |

OTHER PUBLICATIONS http://www.bluetoothshareware.com/bluetooth_remote_control.asp, 2 pages, Oct. 11, 2005.
http://www.bluetoothshareware.com/bluetooth_remote_control_changes.asp, 3 pages, Oct. 11, 2005.

(Continued)

*Primary Examiner* — Un C Cho
(74) *Attorney, Agent, or Firm* — Withrow & Terranova, PLLC (57) ABSTRACT

A system and method are provided for controlling content played by a number of media devices. In general, the system includes a mobile device and the number of media devices. The mobile device includes a wireless communication interface for communicating with the media devices, a media database, and a control system including a media client. When the mobile device enters a Wireless Personal Area Network (WPAN) associated with a media device, the media client obtains information describing the content residing at the media device and stores the information in the media database at the mobile device. Thereafter, when the mobile device is within the WPAN associated with the media device, the media database is used to select content to be played at the media device.

18 Claims, 7 Drawing Sheets

| ID | NAME | TYPE | LAST PLAYED | SERVER |
|---|---|---|---|---|
| 1 | BIRTHDAY | JPEG | 10-3-2005 4:24 PM | KITCHEN |
| 2 | SWEET HOME ALABAMA | MP3 | 8-12-2005 9:04 AM | STUDY |
| 3 | HELLO | WMA | 9-16-2005 7:53 PM | STUDY |
| . . | . . | . | . | . . |
| . . | . . | . | . | . . |
| . . | . . | . | . | . . |

38

OTHER PUBLICATIONS http://www.bluetoothshareware.com/bluetooth_remote_control_manual.asp, 3 pages, Oct. 11, 2005.
http://www.bluetoothshareware.com/bluetooth_remote_control_requirements.asp, 2 pages, Oct. 11, 2005.
http://www.bluetoothshareware.com/bluetooth_remote_control_screenshots.asp, 5 pages, Oct. 11, 2005.
Non-Final Rejection mailed Dec. 31, 2007, issued by the Patent Office during the prosecution of U.S. Appl. No. 11/270,293. 15 pages.
Non-Final Rejection mailed Aug. 5, 2008, issued by the Patent Office during the prosecution of U.S. Appl. No. 11/270,293. 15 pages.
Notice of Allowance mailed Apr. 29, 2010, issued by the Patent Office during the prosecution of U.S. Appl. No. 11/270,293. 5 pages.
Non-Final Rejection mailed Nov. 5, 2010, issued by the Patent Office during the prosecution of U.S. Appl. No. 12/846,109. 9 pages.
Notice of Allowance mailed Feb. 3, 2011, issued by the Patent Office during the prosecution of U.S. Appl. No. 12/846,109. 6 pages.

* cited by examiner

| ID | NAME | TYPE | LAST PLAYED | SERVER |
|---|---|---|---|---|
| 1 | BIRTHDAY | JPEG | 10-3-2005 4:24 PM | KITCHEN |
| 2 | SWEET HOME ALABAMA | MP3 | 8-12-2005 9:04 AM | STUDY |
| 3 | HELLO | WMA | 9-16-2005 7:53 PM | STUDY |
| ⋮ | ⋮ | ⋮ | ⋮ | ⋮ |

PERSONAL AREA NETWORK HAVING MEDIA PLAYER AND MOBILE DEVICE CONTROLLING THE SAME

RELATED APPLICATIONS

This patent application is a Continuation of U.S. patent application Ser. No. 12/846,109, filed Jul. 29, 2010, entitled PERSONAL AREA NETWORK HAVING MEDIA PLAYER AND MOBILE DEVICE CONTROLLING THE SAME, which is a Continuation of U.S. patent application Ser. No. 11/270,293, filed Nov. 9, 2005, entitled PERSONAL AREA NETWORK HAVING MEDIA PLAYER AND MOBILE DEVICE CONTROLLING THE SAME, now U.S. Pat. No. 7,787,904, the disclosures of which are hereby incorporated herein by reference in their entireties.

FIELD OF THE INVENTION

The present invention relates to controlling content played at a number of media devices using a mobile device.

BACKGROUND OF THE INVENTION

Each day one encounters numerous media devices such as computers, televisions with digital video recorders, MP3 players, and the like. These media devices may be located in various environments such as one's home, office, or automobile. However, to date, there is no way of easily ascertaining the content available on these different media devices and controlling or selecting the content played by these media devices using a mobile device. As such, there remains a need for a system and method for ascertaining the content available at a plurality of media devices and controlling the content played by the media devices using a mobile device.

SUMMARY OF THE INVENTION

The present invention relates to a system and method for controlling content played by a number of media devices. In general, the system includes a mobile device and the number of media devices. The mobile device includes a wireless communication interface for communicating with the media devices, a media database, and a control system including a media client. When the mobile device enters a Wireless Personal Area Network (WPAN) associated with a media device, the media client communicates with the media device to obtain information describing the content residing at the media device and stores the information in the media database at the mobile device. Thereafter, when the mobile device is within the WPAN associated with the media device, the media database is used to select content to be played at the media device.

In one embodiment, when the mobile device is within the WPAN associated with the media device, the media client interacts with a user of the mobile device and enables the user to select desired content to be played at the media device from the media database. The media client communicates with the media device to instruct the media device to play the desired content. In another embodiment, when the mobile device is within the WPAN associated with the media device, the media client automatically selects desired content to be played from the media database based on predetermined user preferences and instructs the media device to play the desired content.

In another embodiment, the media database of the mobile device operates as a master database. The mobile device stores last-played time-stamps for the content in the media database in addition to the information describing the content for each of a number of media devices. When the mobile device enters the WPAN associated with a media device, the mobile device provides the information describing the content stored at each of the number of media devices and the last-played time-stamps for the content to the media device. Based on the information and the last-played time-stamps, the media device automatically selects the desired content to be played. For example, based on the information and the last-played time-stamps, the media device may determine a play history and select desired content that is consistent with the play history.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
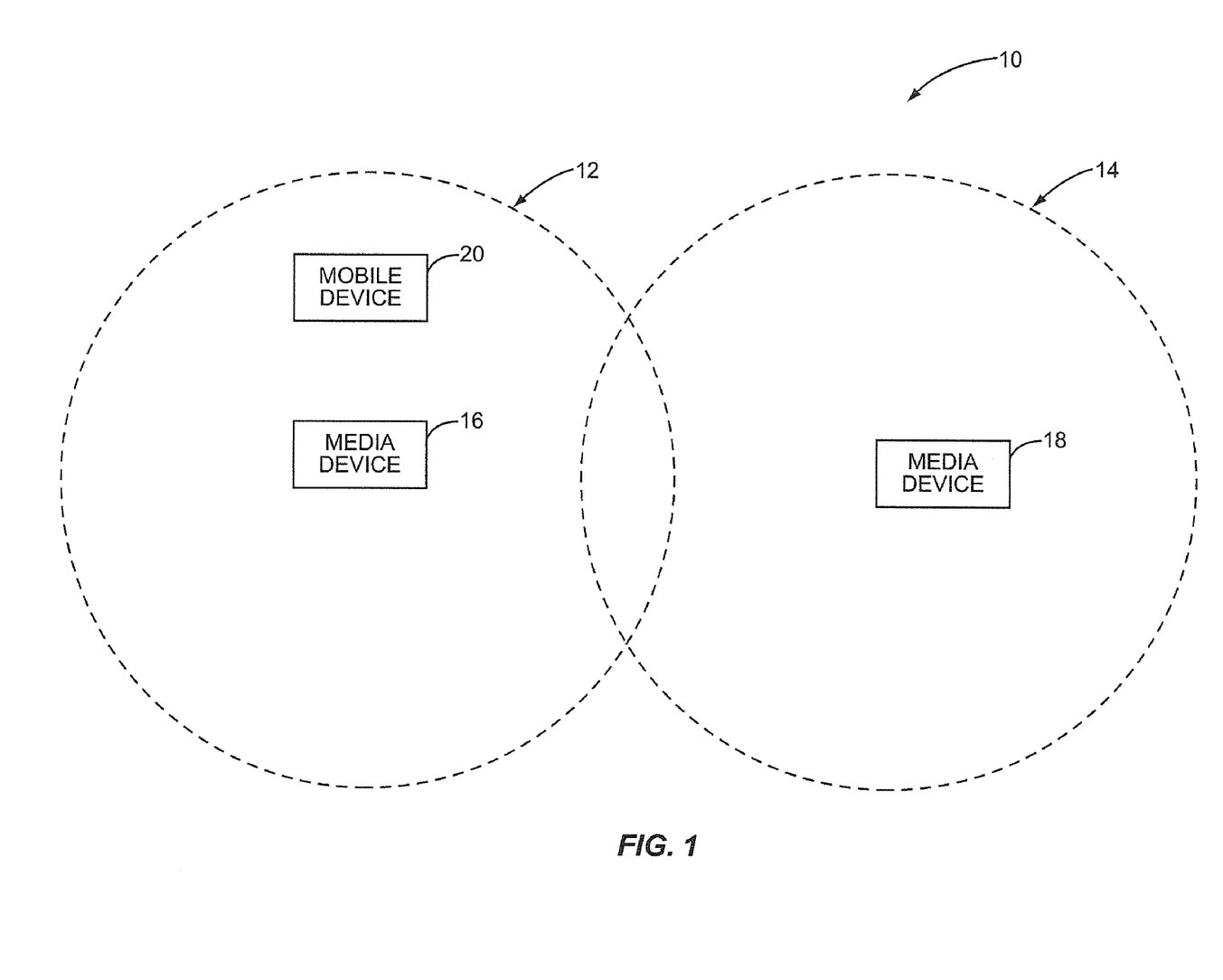
FIG. 1 is a block diagram of a system including a mobile device and a number of media devices, wherein the mobile device controls the content played by the media devices according to one embodiment of the present invention.

The present invention provides a system for controlling content played by a number of media devices. An exemplary system 10 is illustrated in FIG. 1. In this embodiment, the system 10 includes two Wireless Personal Area Networks (WPANs) 12 and 14. Although only two WPANs 12 and 14 are illustrated, the system 10 may include any number of WPANs 12 and 14. In addition, the WPANs 12 and 14 may or may not overlap. The WPAN 12 includes a media device 16, and the area covered by the WPAN 12 depends upon a range of a wireless communication interface associated with the media device 16. Likewise, the WPAN 14 includes a media device 18, and the area covered by the WPAN 14 depends upon a range of a wireless communication interface associated with the media device 18.

As discussed below, the media devices 16 and 18 include media players and content that may be played by the media players. A mobile device 20, which includes a wireless communication interface, operates to control the content played by the media players of the media devices 16 and 18. More specifically, the first time that the mobile device 20 enters the WPAN 12, the mobile device 20 communicates with the media device 16 to obtain metadata defining the content stored at the media device 16 and then stores the metadata. The metadata may more generally be referred to as any information describing the content stored at the media device 16. Thereafter, a user associated with the mobile device 20 may select desired content to be played using the stored metadata. Alternatively, the mobile device 20 may automatically select desired content to be played based on user preferences. The mobile device 20 then communicates with the media device 16 to direct the media device 16 to play the desired content. In response, the media device 16 plays the desired content. Likewise, when the mobile device 20 enters the WPAN 14, the mobile device 20 obtains and stores metadata describing the content stored by the media device 18 and directs the media device 18 to play desired content.

Figure 2:
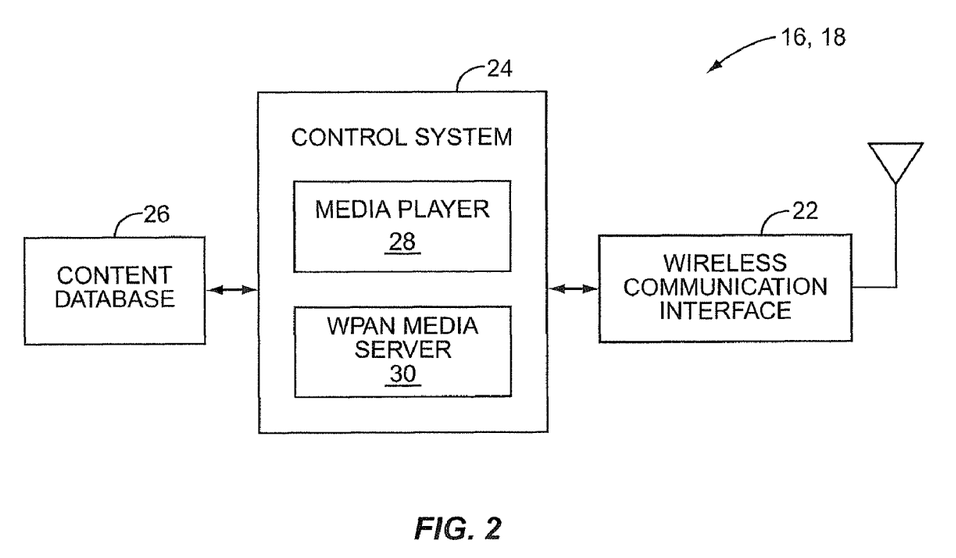
FIG. 2 is a block diagram of an exemplary media device according to one embodiment of the present invention.

Each of the media devices 16 and 18 may be a personal computer, a digital video recorder associated with a television, an audio player such as a Moving Pictures Experts Group (MPEG) Audio Layer-3 (MP3) player, a digital picture frame, or the like. An exemplary embodiment of the media device 16 is illustrated in FIG. 2. Note that this discussion is equally applicable to the media device 18. As shown, the media device 16 includes a wireless communication interface 22, a control system 24, and a content database 26. The wireless communication interface 22 may be a stand-alone device communicatively coupled to the control system 24 and operating to provide wireless communication between the media device 16 and the mobile device 20. Alternatively, the wireless communication interface 22 may be embedded within the media device 16. The wireless communication interface 22 may operate according to a wireless communication standard such as, but not limited to, the Bluetooth wireless communication standard, the Zigbee wireless communication standard, the Wireless Fidelity (WiFi) wireless communication standard, or the IEEE 802.11 wireless communication standards.

The control system 24 includes a media player 28 and a WPAN media server 30, which is hereinafter referred to as the media server 30. The media player 28 may be implemented in hardware and/or software and operates to play the content in the content database 26 such that people within the WPAN or near to the media device 16 can view and/or listen to the content. The content database 26 may be any storage device such as, but not limited to, a hard drive or Random Access Memory (RAM) and operates to store content such as digital video files, digital audio files, digital images, slideshows of digital images, or the like.

The media server 30 may be implemented in software and/or hardware and operates to instruct the media player 28 to play select content based on instructions or information received from the mobile device 20. In addition, the media server 30 may optionally scan the content database 26 for content that may be played at initial start-up or periodically throughout operation. This may be referred to as "auto-discovering" the content. Additionally or alternatively, a user associated with the media device 16 may configure the media server 30 to select the content or content types to be made available to the mobile device 20.

Figure 3:
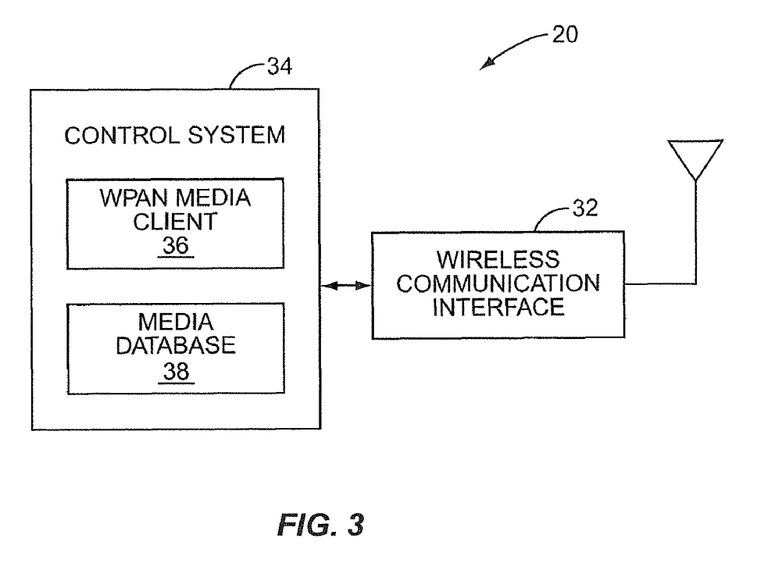
FIG. 3 is a block diagram of an exemplary mobile device according to one embodiment of the present invention.

FIG. 3 is a block diagram illustrating an exemplary embodiment of the mobile device 20. The mobile device 20 may be a mobile phone, Personal Digital Assistant (PDA), or the like. Alternatively, the mobile device 20 may be a stand-alone device similar to a remote control. In general, the mobile device 20 includes a wireless communication interface 32 and a control system 34. The wireless communication interface 32 may be a stand-alone device communicatively coupled to the control system 34 and operating to provide wireless communication between the mobile device 20 and the media devices 16 and 18. Alternatively, the wireless communication interface 32 may be embedded within the mobile device 20. The wireless communication interface 32 may operate according to a wireless communication standard such as, but not limited to, the Bluetooth wireless communication standard, the Zigbee wireless communication standard, or the Wireless Fidelity (WiFi) wireless communication standard, or the IEEE 802.11 wireless communication standards.

The control system 34 includes a WPAN media client 36 and a media database 38. The WPAN media client 36 is hereafter referred to as the media client 36. The media client 36 may be implemented in hardware and/or software and operates to provide instructions or information to the media server 30 in order to control the content played by the media player 28. As discussed below in more detail, when the mobile device 20 enters one of the WPANs 12, 14, the media client 36 interacts with the media server 30 to obtain metadata describing the content in the content database 26. The metadata is stored in the media database 38 and may include information such as a file name, file type, and an identifier of the WPANs 12, 14 for each file in the content database 26. Note that, in the preferred embodiment, the media database 38 stores metadata describing the content in the content database 26 for each of the WPANs 12, 14. In addition, last-played time-stamps for the content may be added to the media database 38, as discussed below. A user associated with the mobile device 20 may then browse the media database and select content to be played. For example, if the mobile device 20 is within the WPAN 12, then the user may select content to be played by the media device 16 using the media database 38. If the mobile device 20 is within the WPAN 14, then the user may select content to be played by the media device 18 using the media database 38. In another embodiment, the media client 36 may automatically select content to play from the media database 38 based on preferences previously entered by the user.

Figure 4:
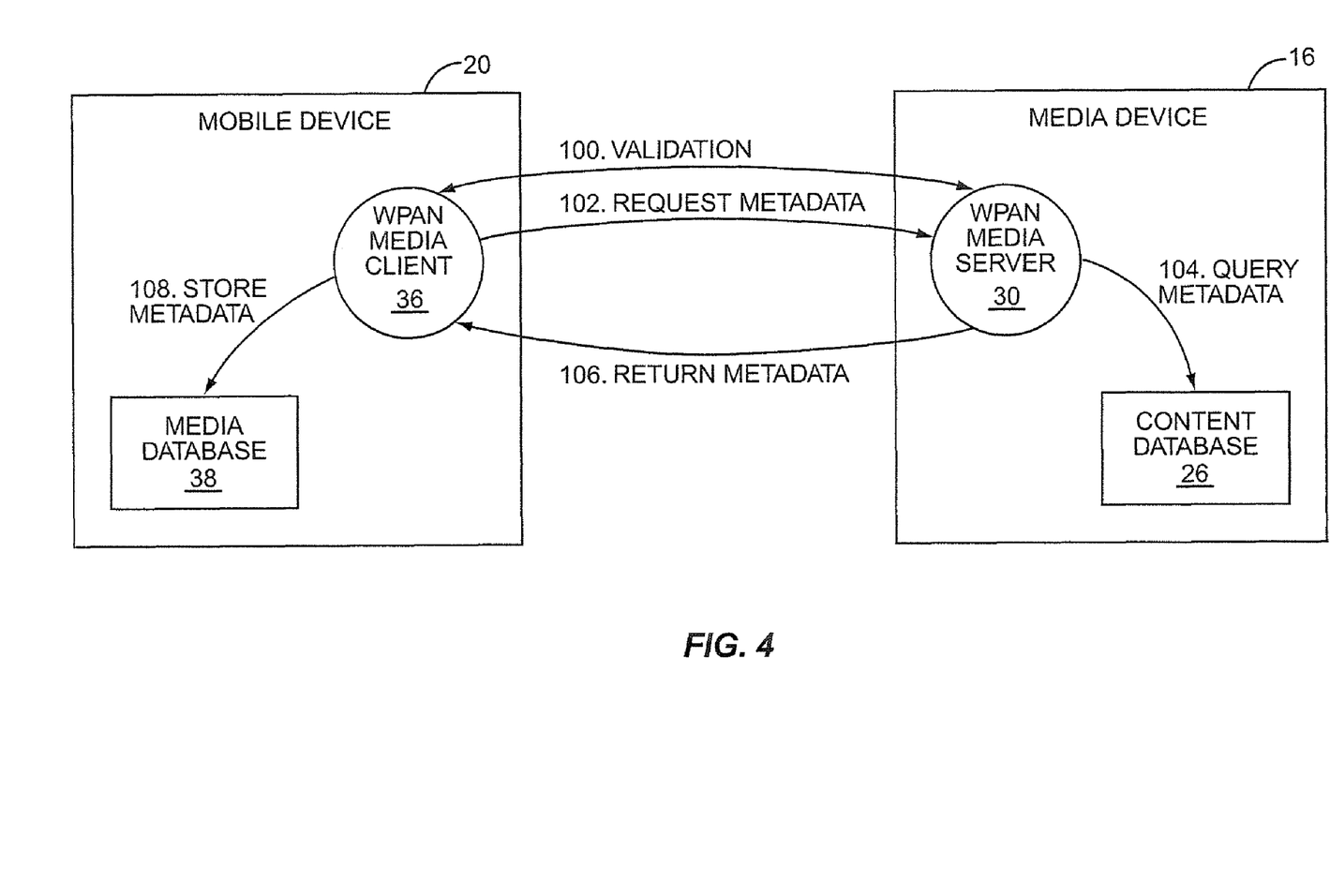
FIG. 4 illustrates a provisioning process wherein a mobile device obtains metadata describing content residing at a media device according to one embodiment of the present invention.

FIG. 4 illustrates a provisioning process performed the first time that the mobile device 20 enters the WPAN 12. Note, however, that this discussion equally applies to the first time that the mobile device 20 enters the WPAN 14. When the mobile device 20 enters the WPAN 12 by coming within the range of the wireless communication interface 22 of the media device 16, the media client 36 detects the media server 30 and a validation process is performed (step 100). During the validation process, the media client 36 interacts with a user associated with the mobile device 20 to obtain a password or key, which may also be referred to as a passkey. Once the passkey is entered by the user, it is provided to the media server 30 and communication between the media client 36 and the media server 30 is established. In the preferred embodiment, the validation process is performed only once when the mobile device 20 enters the WPAN 12 for the first time. If the mobile device 20 leaves the WPAN 12 and later returns, the validation process does not need to be repeated. In one embodiment, the wireless communication interfaces 22, 32 of the media device 16 and mobile device 20, respectively, operate according to the Bluetooth wireless communication standard and the validation process is the pairing process described in the Bluetooth specification.

Once validation is complete, the media client 36 sends a request to the media server 30 for metadata describing the content in the content database 26 at the media device 16 (step 102). In response, the media server 30 queries the content database 26 to obtain the metadata describing the content within the content database 26 (step 104). The metadata may include information such as the file name and file type for each file in the content database 26. In addition, the media server 30 may add a server name or identifier of the media device 16 to the metadata. The media server 30 then returns the metadata to the media client 36 (step 106), and the media client 36 stores the metadata in the media database 38 (step 108).

Steps 100-108 are repeated each time the mobile device 20 enters one of the WPANs 12, 14 for the first time. As such, the media database 38 stores metadata describing the content in the content databases 26 for each of the WPANs 12, 14.

Figure 5:
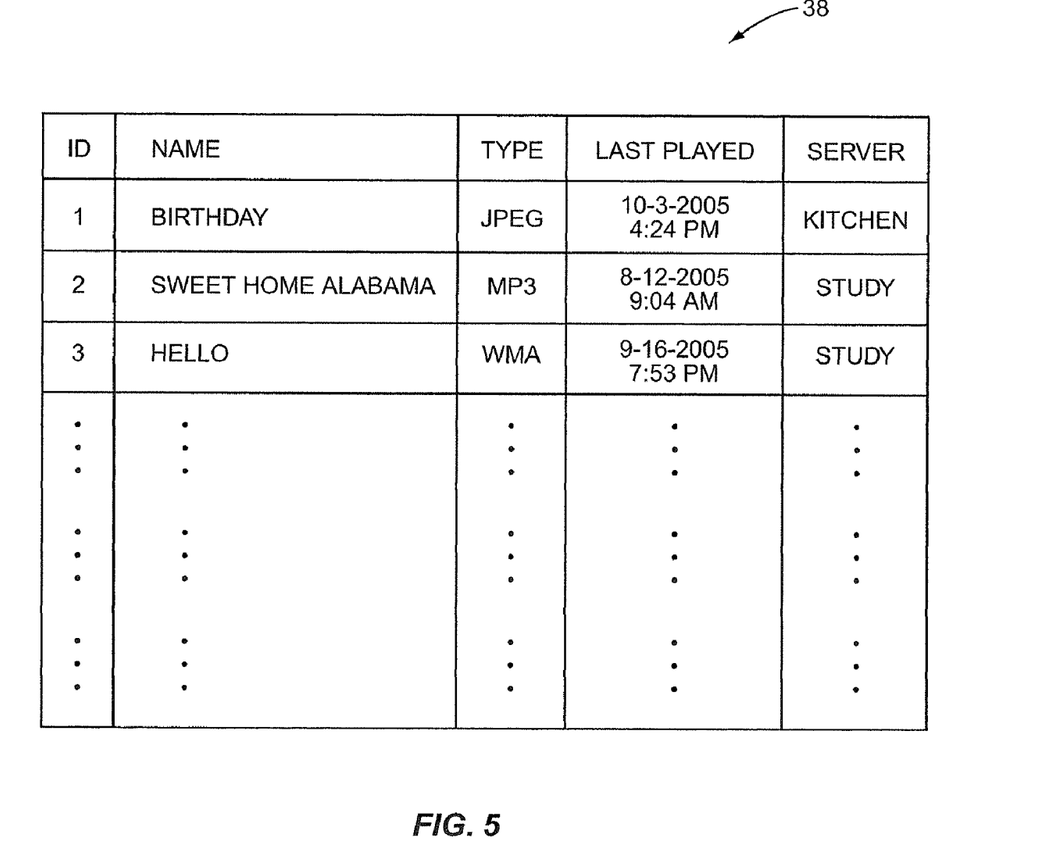
FIG. 5 illustrates an exemplary media database for the mobile terminal of FIGS. 1, 3, and 4 according to one embodiment of the present invention.

FIG. 5 illustrates an exemplary embodiment of the media database 38. As shown, the media database 38 includes an ID, file name, file type, last-played time-stamp, and server name for each file stored in the content databases 26 of the media devices 16 and 18. The IDs may be assigned to each of the files by the media client 36. The name and file type are provided in the metadata provided to the media client 36 from the media server 30. The last-played time-stamp indicates the time at which the particular file was last played by the media player 28 and may be added to the media database 38 by the media client 36. Optionally, the last-played time-stamp may be provided in the metadata provided by the media server 30. The server name is an identifier for the WPANs 12, 14 in which the content is located and may be added by the media client 36 or provided in the metadata from the media server 30. In this example, the server names are "Kitchen" and "Study." The "Kitchen" server name may be used to identify the WPAN 12, and the "Study" server name may be used to identify the WPAN 14. Thus, for example, when the mobile device 12 is within the WPAN 12, the media client 36 may enable the user associated with the mobile device 20 to browse the content stored in the content database 26 within the WPAN 12 and select content to be played by the media player 28.

Figure 6:
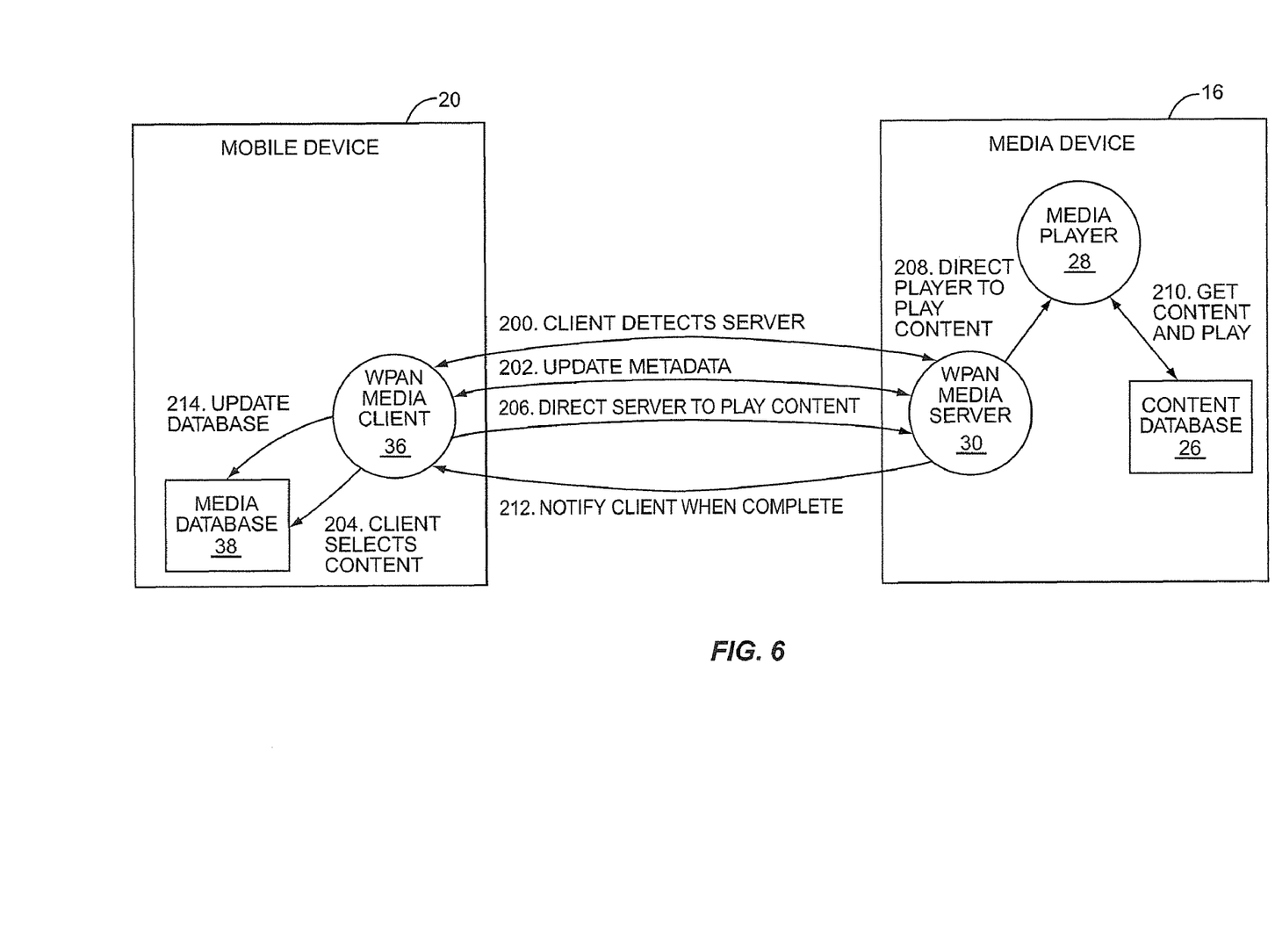
FIG. 6 illustrates a process for controlling the content played by a media device according to one embodiment of the present invention.

FIG. 6 illustrates the process of controlling the content played by the media device 16 according to one embodiment of the present invention. Note, however, that this discussion equally applies to controlling the content played by the media device 18 when the mobile device 20 is within the WPAN 14. The process begins when the mobile device 20 enters the WPAN 12 and the media client 36 detects the media server 30 (step 200). For example, the media server 30 may periodically scan the WPAN 12 for a mobile device 20. Alternatively, the mobile device 20 may periodically perform a scan for the media devices 16, 18. Note that if this process is performed after the provisioning process of FIG. 4, then step 200 may be unnecessary. Once the media client 36 has detected the media server 30 or visa versa, communication between the media client 36 and the media server 30 is established.

Thereafter, the media client 36 may optionally communicate with the media server 30 to obtain any updates to the metadata describing the content in the content database 26 (step 202). This may be particularly beneficial where the mobile device 20 has just re-entered the WPAN 12 after leaving for some period of time during which content may have been added or removed from the content database 26.

The media client 36 then operates to select desired content to play at the media device 16 from the media database 38 (step 204). In one embodiment, a user interacts with the media client 36 to browse the media database 38 and select desired content in the content database 26 to be played. In another embodiment, the user associated with the mobile device 20 may interact with the media client 36 to define preferences. The user may define preferences for each of the WPANs 12 and 14 or a single set of preferences to be applied to all of the WPANs 12 and 14. The preferences may then be used by the media client 36 to automatically select the desired content to be played using the media database 38. As a first example, the user may configure his preferences such that content is selected based on genre. More specifically, the media player 28 within the WPAN 12 may be capable of playing audio content, and the user may configure his preferences such that the media client 36 automatically selects music content in a desired genre such as "rock" when the mobile device 20 is within the WPAN 12. Note that the genre of the content may be provided in the metadata from the media server 30. As a second example, the user may configure his preferences such that non-duplicate content is played. More specifically, the user may configure his preferences such that the media client 36 selects content that has not been previously played or recently played in any other WPAN. As a third example, the user may also configure his preferences such that content to be played is selected randomly by the media client 36. As a fourth example, the user may configure his preferences by defining a play list for each of the WPANs 12 and 14. As a fifth example, the user may configure his preferences such that the media client 36 selects new content as the content to be played.

The media client 36 then directs the media server 30 to play select content from the content database 26 (step 206). Once the media server 30 receives the request to play the desired content from the media client 36, the media server 30 directs the media player 28 to play the desired content (step 208). In response, the media player 28 obtains the desired content from the content database 26 and plays the desired content (step 210). The media server 30 then sends a notification to the media client 36 when the process is complete (step 212). The notification may be sent at any time after the media server 30 directs the media player 28 to play the desired content. For example, the notification may be sent once the playing of the desired content by the media player 28 is complete. Upon receiving the notification from the media server 30, the media client 36 updates the last-played time-stamp for the desired content within the media database 38 (step 214).

Figure 7:
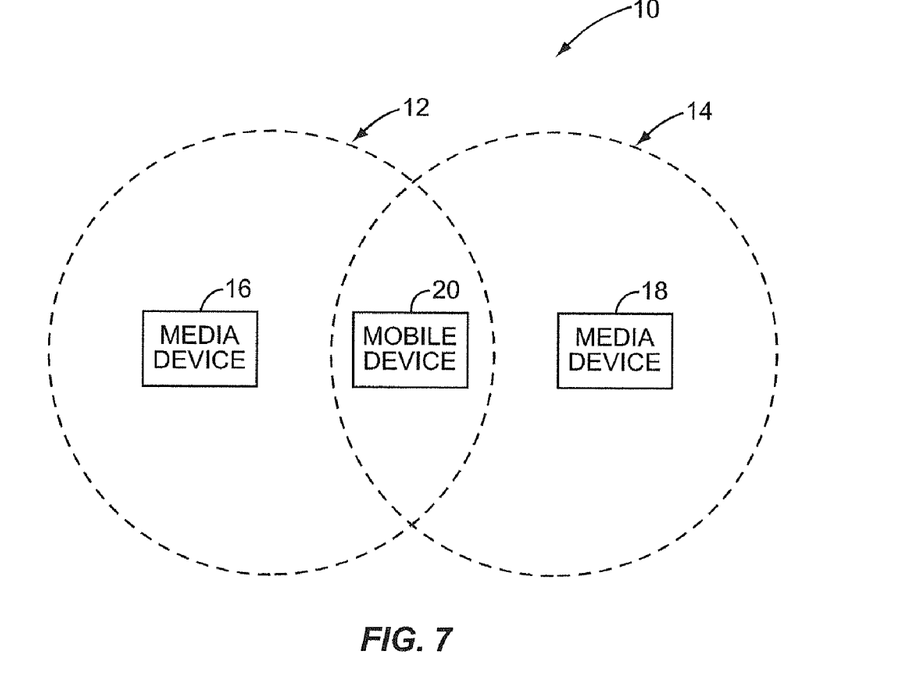
FIG. 7 illustrates an exemplary system wherein a mobile device is simultaneously within Wireless Personal Area Networks (WPANs) associated with two media devices according to one embodiment of the present invention.
Figure 8:
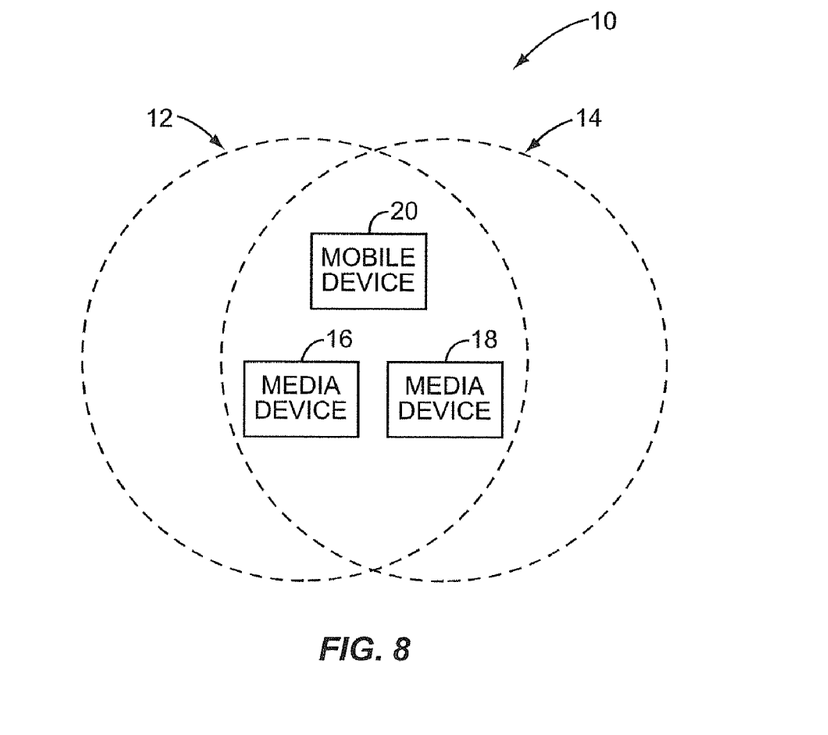
FIG. 8 illustrates an exemplary system wherein a mobile device is simultaneously within Wireless Personal Area Networks (WPANs) associated with two media devices according to another embodiment of the present invention.

FIGS. 7 and 8 illustrate two embodiments where the mobile device 20 is within both of the WPANs 12 and 14 simultaneously. If the media devices 16 and 18 play content types that do not interfere with one another, the mobile device 20 may operate as described above to control both of the media devices 16 and 18. For example, if the media device 16 plays slideshows without audio or displays digital images, then the mobile device 20 may direct the media device 16 to play a slideshow or display digital images while simultaneously directing the media device 18 to play other content such as a movie, song, or slideshow.

On the other hand, if the media device 16 is capable of playing content that may interfere with content played by the media device 18 or vice versa, then the media client 36 may control the media devices 16 and 18 in such a manner as to avoid interference. In one embodiment, the user may select a desired one of the media devices 16 and 18. In another embodiment, the media client 36 may automatically select one of the media devices 16 and 18 based on priorities assigned to the media devices 16 and 18 by the user. In yet another embodiment, the media client 36 may automatically select a one of the media devices 16 and 18 closest to the mobile device 20 based on the strength of the signals received from the media devices 16 and 18. In any of these three embodiments, one of the media devices 16 and 18 is selected and the mobile device 20 operates as described above to control the content played by the selected one of the media devices 16 and 18.

As an alternative, the media client 36 may control the media devices 16 and 18 simultaneously even though the media device 16 is capable of playing content that may interfere with the content played by the media device 18 or vice versa. More specifically, the media client 36 may determine the types of files that may be played by each of the media devices 16 and 18 by examining the file types stored in the media database 38. If any of the file types played by one of the media devices 16, 18 may interfere with the playing of any of the file types played by the other of the media devices 16, 18, the media client 36 may control the selection of content to be played by the media devices 16 and 18 such that interfering file types are not played simultaneously. For example, if the both of the media devices 16, 18 are capable of playing movies and songs or displaying digital images, the mobile device 20 may control the media devices 16 and 18 such that if one of the media devices 16, 18 is playing video (with audio) or audio, then the other of the media devices 16, 18 displays digital images. As another example, assume that the media client 36 operates such that the user selects the content to be played. If the user selects an audio file to be played by the media device 16, then the media client 36 may prevent selection of another audio file to be played by the media device 18 while the media device 16 is playing the selected audio file.

Figure 9:
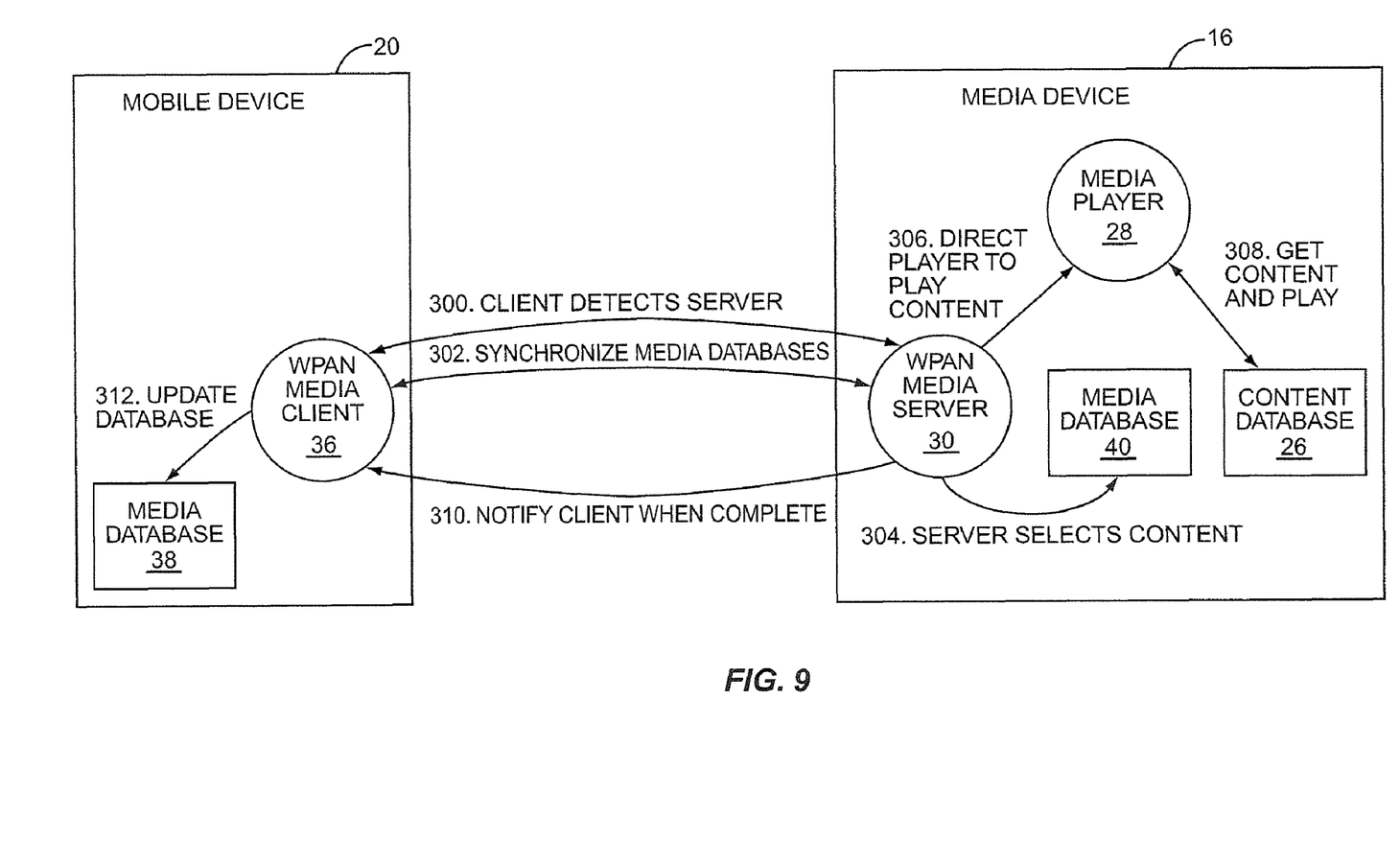
FIG. 9 illustrates a process for controlling the content played by a media device according to another embodiment of the present invention.

FIG. 9 illustrates an alternative process for controlling the content played by the media device 16. This embodiment is similar to that illustrated in FIG. 6. However, in this embodiment, the media server 30, rather than the media client 36, selects the content to be played. The process begins when the mobile device 20 enters the WPAN 12 and the media client 36 detects the media server 30 (step 300). For example, the media server 30 may periodically scan for the mobile device 20. Alternatively, the mobile device 20 may periodically perform a scan for the media devices 16, 18. Note that if this process is performed after the provisioning process of FIG. 4, then step 300 may be unnecessary. Once the media client 36 has detected the media server 30 or visa versa, communication between the media client 36 and the media server 30 is established.

Thereafter, the media client 36 communicates with the media server 30 to synchronize the media database 38 with a media database 40 at the media device 16 (step 302). More specifically, the media database 38 at the mobile device 20 operates as a master database and includes the metadata describing the content stored in the content databases 26 of the WPANs 12 and 14. In addition, the media database 38 stores the last-played time-stamp for each file. Synchronization may begin by updating the media database 38 to add metadata describing content recently added to the content database 26 or remove metadata describing content recently removed from the content database 26. Then, the media client 36 communicates with the media server 30 such that the media database 40 at the media device 16 includes all of the information from the media database 38 at the mobile device 20.

Thereafter, the media server 30, rather than the media client 36, selects the content to be played using the media database 40 (step 304). For example, the media server 30 may select content such that only new content is played. Since the media database 40 includes information for each of the WPANs 12 and 14, the media server 30 may select only new content that has not yet been played in either of the WPANs 12 and 14. Alternatively, the media server 30 may intelligently decide what content to select based on the past play history. More specifically, the media server 30 may examine the last-played time-stamp for the files to determine the play history either in the WPAN 12 or in both of the WPANs 12 and 14. Based on the examination, the media server 30 may determine that all or a majority of the last N files that were played are music files of a particular genre, digital images of the user's children, or the like. Based on this determination, the media server 30 may select content to be played that is consistent with the play history.

After selecting the content, the media server 30 directs the media player 28 to play the select content (step 306). In response, the media player 28 obtains the select content from the content database 26 and plays the select content (step 308). The media server 30 then sends a notification to the media client 36 when the process is complete (step 310). The notification may be sent at any time after the media server 30 directs the media player 28 to play the select content. For example, the notification may be sent once the playing of the select content by the media player 28 is complete. Upon receiving the notification from the media server 30, the media client 36 updates the last-played time-stamp for the select content within the media database 38 (step 312).

Those skilled in the art will recognize improvements and modifications to the preferred embodiments of the present invention. All such improvements and modifications are considered within the scope of the concepts disclosed herein and the claims that follow.

What is claimed is:

1. A method of operation of a mobile device when the mobile device is within a wireless network, comprising:
    detecting a media device associated with the wireless network;
    sending a request to the media device via the wireless network to obtain metadata that describes content available on the media device;
    receiving the metadata from the media device via the wireless network, wherein the metadata comprises a listing of content items available on the media device and last played time-stamps for the content items; and
    sending a request to the media device via the wireless network to play a select content item from the content items listed in the metadata from the media device.

2. The method of claim 1, wherein the select content item was selected by a user of the mobile device from the content items listed in the metadata from the media device.

3. The method of claim 1 further comprising programmatically selecting the select content item from the content items listed in the metadata from the media device based on one or more of a group consisting of: the last played time-stamps for the content items and metadata that describes content available on one or more other media devices previously received and stored by the mobile device while the mobile device was in one or more corresponding wireless networks associated with the one or more other media devices.

4. The method of claim 1 further comprising, in response to detecting the media device associated with the wireless network, sending a passkey via the wireless network to the media device to complete a validation process.

5. The method of claim 1, wherein the wireless network is a wireless personal area network (WPAN).

6. The method of claim 1, wherein the wireless network is a wireless local area network (WLAN).

7. The method of claim 1, wherein the wireless network is an IEEE 802.11 network.

8. The method of claim 1, wherein the media device is a digital video recorder (DVR).

9. The method of claim 1, wherein the mobile device receives a server name associated with a media server of the media device.

10. A method of operation of media device, comprising:
  receiving, via a wireless network, a request from a mobile device when the mobile device is in the wireless network for metadata that describes content available on the media device;
  sending the metadata to the mobile device via the wireless network, wherein the metadata comprises a listing of content items available on the media device and last played time-stamps for the content items;
  receiving a request from the mobile device via the wireless network to play a select content item from the content items listed in the metadata from the media device; and
  playing the select content item.

11. The method of claim 10 further comprising receiving a passkey via the wireless network from the mobile device to complete a validation process.

12. The method of claim 10, wherein the wireless network is a wireless personal area network (WPAN).

13. The method of claim 10, wherein the wireless network is a wireless local area network (WLAN).

14. The method of claim 10, wherein the wireless network is an IEEE 802.11 network.

15. The method of claim 10, wherein the media device is a digital video recorder (DVR).

16. The method of claim 10, further comprising sending a server name associated with a media server of the media device to the mobile device via the wireless network.

17. A media device comprising:
  a control system adapted to:
    receive, via a wireless network, a request from a mobile device when the mobile device is in the wireless network for metadata that describes content available on the media device;
    send the metadata to the mobile device via the wireless network, wherein the metadata comprises a listing of content items available on the media device and last played time-stamps for the content items;
    receive a request from the mobile device via the wireless network to play a select content item from the content items listed in the metadata from the media device; and
    play the select content item.

18. The media device of claim 17 further comprising a wireless communication interface communicatively coupling the media device to the wireless network.

* * * * *